(No Model.)

A. NICOLET.
STOPPER FOR BURST PIPES.

No. 329,938. Patented Nov. 10, 1885.

Attest
L. Lees
Henry J. Shebeath.

Inventor
Albert Nicolet, per
Crane & Miller, Attys.

UNITED STATES PATENT OFFICE.

ALBERT NICOLET, OF NEWARK, NEW JERSEY.

STOPPER FOR BURST PIPES.

SPECIFICATION forming part of Letters Patent No. 329,933, dated November 10, 1885.

Application filed March 25, 1885. Serial No. 160,065. (No model.)

*To all whom it may concern:*

Be it known that I, ALBERT NICOLET, a citizen of the United States, residing in Newark, Essex county, New Jersey, have invented certain new and useful Improvements in Stoppers for Burst Pipes, fully described and represented in the following specification and the accompanying drawings, forming a part of the same.

This invention is intended to be used for stopping a sudden break or rupture in a hose or pipe; and it consists in the combination, with a cylindrical casing composed of two hinged sections and having an aperture in one of such sections, of a stopper fitted within the said aperture and operated by a stem having a screw-thread inserted through a boss attached to the casing.

It also consists in a particular construction for the stopper, to fit it more easily to the surface of the ruptured hose or pipe.

Figure 1:
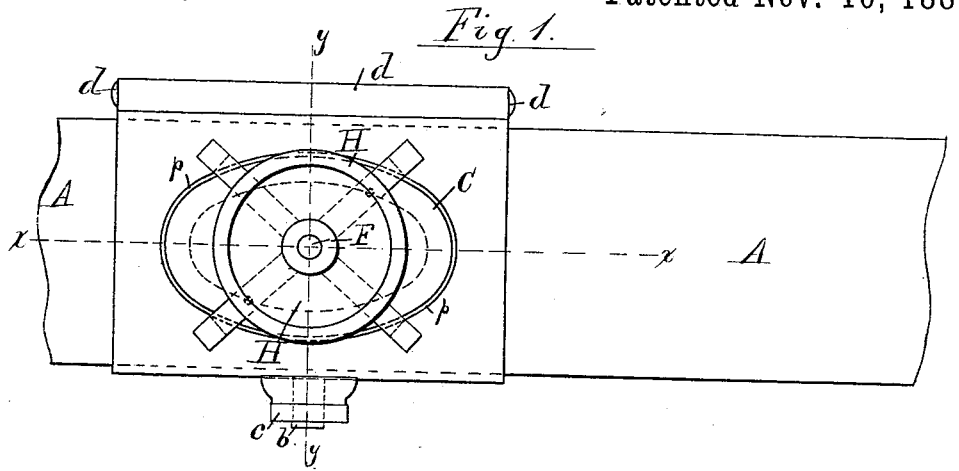
Figure 2:
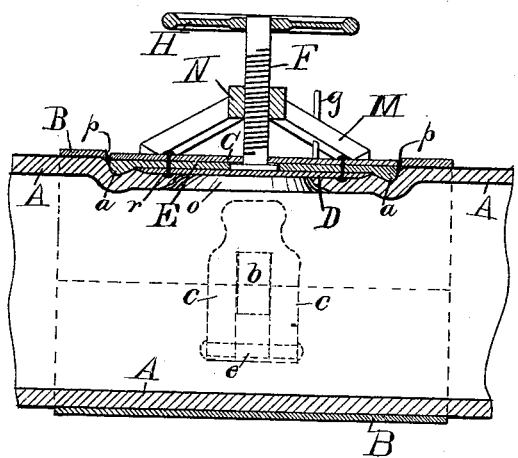
Figure 3:
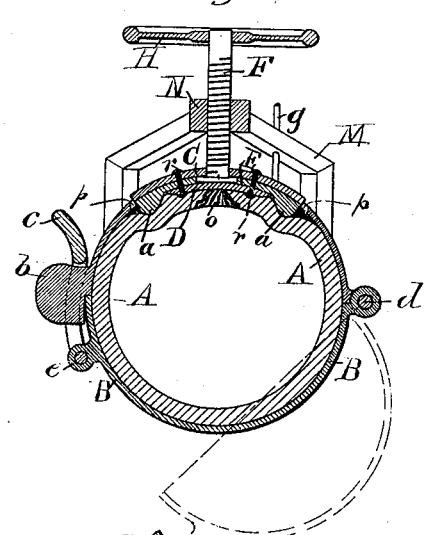
Figure 4:
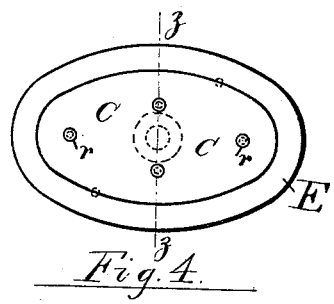
Figure 5:
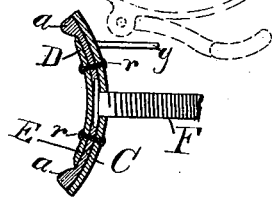

In the drawings, Figure 1 is a plan of my improvement applied to a ruptured hose. Fig. 2 is a longitudinal section on the line $x\,x$ in Fig. 1. Fig. 3 is a transverse section on the line $y\,y$ in Fig. 1; Fig. 4, a view of the under side of the stopper; and Fig. 5 is a transverse section on the line $z\,z$ in Fig. 4.

In Figs. 1, 2, and 3 my invention is shown applied to a flexible hose. Figs. 2, 3, and 5 show the stem of the stopper not in section.

A is a flexible hose, represented as ruptured at the point $o$.

B is the casing surrounding the hose at the point where the rupture has occurred, and having an aperture, $p$, shown directly over the rupture in the hose.

The casing consists of a cylindrical shell divided into two longitudinal sections hinged at $d$ on one side, and having a fastening at the other composed of the lug $b$, projecting from the upper section, and the link $c$, which is pivoted to an ear, $e$, on the lower section.

The casing may be opened for the insertion of the hose or pipe, as shown by the dotted lines in Fig. 3.

The stopper consists in an arched segment adapted to fit closely to the hose at the ruptured point.

In order to allow the stopper to adjust itself to the roughness and inequalities of the hose or pipe to which it is applied, I construct the same with an annular ridge at its outer edge, as shown in the drawings, where C and D are two plates between which is clamped a disk of rubber or other material which would perform its required function.

C is the upper plate, made to cover the whole area of the disk E, and D the lower plate, which is made smaller than the rubber disk to allow the annular ridge $a$ constructed thereon to bear upon the hose around the rupture in the same. The metal plates C and D and rubber disk E are fastened together by the rivets $r$.

$g$ are guide-pins projecting from the upper plate of the stopper through holes bored in the arms M, supporting the boss N, and which direct the path of the stopper and prevent its turning when said stopper is operated. The stopper is operated by the threaded stem F, having the collar $f$ at its lower end held between the plates C and D, an aperture being made in the disk E for its reception, said stem F passing through the boss N, and having at its upper end a hand-wheel, H, by means of which it can be turned to press the stopper upon the hose at the ruptured point.

In operating my device the casing is opened and its upper section placed on the hose, with its aperture $p$ directly over the rupture at $o$, the stopper being withdrawn, so as not to interfere with such adjustment. The lower section of the casing is then clamped to the upper by the link $c$. The stopper is then screwed down until it presses with sufficient force upon that part of the hose around the ruptured point $o$ to completely stop the leakage.

When this device is applied to a rubber hose, as shown in the drawings, it will be seen that the ridge $a$ causes a corresponding depression in the surface of the hose, the soft material of the ridge $a$ serving to produce a tight joint between them.

My invention is particularly adapted for use in cases where the hose connected with a fire-engine bursts. Sometimes great loss is sustained by the delay caused by the changing of a hose when such break occurs.

By the use of my invention a break can be stopped in the time necessary to apply it at the point of rupture, and the hose may then be used until it can be permanently mended.

Although I have herein shown and described my invention as applied to a flexible hose, it may also be used in connection with metallic pipes.

I am aware of United States Patent No. 216,639, which shows a divided jacket, the two halves of which are pressed upon the hose by means of a screw-clamp, the same operating to compress the hose within the entire length of the jacket.

In my invention I employ a cylindrical casing, which is not used to press against the hose, but serves only as a support for the hose to keep it in shape, and the rupture is stopped by a device operating independently of the casing through an aperture in the side of the same. I therefore disclaim the construction shown in said patent.

Having thus described my invention, I claim the same as follows:

1. As a device for stopping burst pipes, a sectional casing provided with means for securing it removably to the pipe, and having a stopper held adjustably in an aperture in one side of the casing, as and for the purpose set forth.

2. The combination, with the hinged sectional casing provided with a fastening and constructed with aperture $p$, as described, of a stopper applied to the aperture, and means for pressing the same upon the burst pipe, substantially as and for the purpose set forth.

3. The combination, with the hinged sectional casing having a fastening and aperture, as described, of the boss N, attached to the casing, as set forth, the stopper constructed to receive the stem F, and the threaded stem provided with the handle or wheel H, and with a collar to fit the stopper, as and for the purpose set forth.

4. The combination, with the means for clamping the stopper on the burst pipe, of the stopper composed of the plate C, having the india-rubber annular ridge secured thereto, as and for the purpose set forth.

In testimony whereof I have hereunto set my hand in the presence of two subscribing witnesses.

ALBERT NICOLET.

Witnesses:
   THOS. S. CRANE,
   L. LEE.